US012572168B2

(12) United States Patent
Wang

(10) Patent No.: US 12,572,168 B2
(45) Date of Patent: Mar. 10, 2026

(54) FOLDABLE DISPLAY MODULES AND FOLDABLE DISPLAY DEVICES

(71) Applicant: Wuhan China Star Optoelectronics Semiconductor Display Technology Co., Ltd., Hubei (CN)

(72) Inventor: Wenqiang Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 167 days.

(21) Appl. No.: 18/565,104

(22) PCT Filed: Jun. 30, 2023

(86) PCT No.: PCT/CN2023/104841
§ 371 (c)(1),
(2) Date: Nov. 29, 2023

(87) PCT Pub. No.: WO2024/093322
PCT Pub. Date: May 10, 2024

(65) Prior Publication Data
US 2025/0093908 A1      Mar. 20, 2025

(30) Foreign Application Priority Data
Nov. 1, 2022    (CN) .......................... 202211358194.3

(51) Int. Cl.
*G06F 1/16*        (2006.01)
(52) U.S. Cl.
CPC .......... *G06F 1/1616* (2013.01); *G06F 1/1656* (2013.01)

(58) Field of Classification Search
CPC ...................................................... G06F 1/1652
See application file for complete search history.

(56) References Cited

U.S. PATENT DOCUMENTS 10,164,208 B2 * 12/2018 Lee ........................... B32B 3/30
10,916,719 B2 * 2/2021 Park ........................ G09F 9/301
(Continued)

FOREIGN PATENT DOCUMENTS

CN        111508370        8/2020
CN        211375480 U  *  8/2020
(Continued)

OTHER PUBLICATIONS

International Search Report and the Written Opinion Dated Sep. 28, 2023 From the International Searching Authority Re. Application No. PCT/CN2023/104841 and Its Translation Into English. (21 Pages).
(Continued)

*Primary Examiner* — Adrian S Wilson

(57) ABSTRACT

The present disclosure provides foldable display modules and foldable display devices. The foldable display module includes a display panel and a support plate. The support plate includes first hole groups and second hole groups alternately arranged along a second direction. The first hole group includes a plurality of first via holes, and the second hole group includes a plurality of second via holes. In a first direction, a length of the first via hole is greater than a length of the second via hole, and the second via holes are arranged corresponding to first spacer parts each located between two adjacent first via holes.

20 Claims, 9 Drawing Sheets

(56)     References Cited

U.S. PATENT DOCUMENTS

| | | | | |
|---|---|---|---|---|
| 11,119,539 | B2 * | 9/2021 | Lee | H05K 1/189 |
| 11,132,027 | B2 * | 9/2021 | Park | G06F 1/1616 |
| 11,176,851 | B2 * | 11/2021 | Wang | G09F 9/301 |
| 11,334,117 | B2 * | 5/2022 | Youn | H10K 77/111 |
| 11,395,415 | B2 * | 7/2022 | Gu | G06F 1/1613 |
| 11,487,327 | B2 * | 11/2022 | Horiuchi | G06F 1/1652 |
| 11,503,727 | B2 | 11/2022 | Seo et al. | |
| 11,546,986 | B2 * | 1/2023 | Wang | H05K 1/028 |
| 11,721,246 | B2 * | 8/2023 | Wang | H10K 50/8426 |
| | | | | 257/40 |
| 11,823,595 | B2 * | 11/2023 | Wang | G06F 1/1616 |
| 11,841,746 | B2 * | 12/2023 | Kang | G06F 1/1652 |
| 12,300,127 | B2 * | 5/2025 | Wang | H05K 7/1438 |
| 12,307,927 | B2 * | 5/2025 | Wang | G09F 9/335 |
| 12,353,256 | B2 * | 7/2025 | Wang | G06F 1/1656 |
| 2019/0269011 | A1 * | 8/2019 | Lee | H05K 3/0014 |
| 2021/0165454 | A1 * | 6/2021 | Dong | G06F 1/1652 |
| 2021/0325929 | A1 * | 10/2021 | Cai | B32B 3/04 |
| 2021/0360800 | A1 * | 11/2021 | Horiuchi | H04M 1/0216 |
| 2022/0309964 | A1 * | 9/2022 | Wang | G06F 1/1681 |
| 2022/0343807 | A1 | 10/2022 | Lee et al. | |
| 2022/0399521 | A1 * | 12/2022 | Kang | B32B 15/20 |
| 2023/0017674 | A1 | 1/2023 | Kim et al. | |
| 2023/0082293 | A1 | 3/2023 | Lv et al. | |
| 2023/0114378 | A1 | 4/2023 | Han | |
| 2023/0335022 | A1 * | 10/2023 | Wang | G09F 9/301 |
| 2024/0096245 | A1 * | 3/2024 | Wang | G06F 1/1681 |
| 2025/0081366 | A1 * | 3/2025 | Wang | H05K 5/0217 |

FOREIGN PATENT DOCUMENTS

| | | |
|---|---|---|
| CN | 211481295 | 9/2020 |
| CN | 112927625 | 6/2021 |
| CN | 113257123 | 8/2021 |
| CN | 113270028 | 8/2021 |
| CN | 114446170 | 5/2022 |
| CN | 217113706 | 8/2022 |
| CN | 115662296 | 1/2023 |
| EP | 4220349 | 8/2023 |
| JP | 2024-530067 | 8/2024 |
| KR | 10-2020-0052621 | 5/2020 |
| KR | 10-2020-0079956 | 7/2020 |

OTHER PUBLICATIONS

Notice of Reasons for Refusal Dated Dec. 24, 2024 From the Japan Patent Office Re. Application No. 2023-571967 and Its Translation Into English. (8 Pages).

Notice of Reasons for Rejection Dated Jul. 1, 2025 From the Japan Patent Office Re Application No. 2023-571967 and its Translation into English. (11 Pages).

Notification of Office Action and Search Report Dated May 30, 2025 From the State Intellectual Property Office of the People's Republic of China Re. Application No. 202211358194.3 and Its Translation of Office Action into English. (20 Pages).

* cited by examiner

FOLDABLE DISPLAY MODULES AND FOLDABLE DISPLAY DEVICES

RELATED APPLICATIONS

This application is a National Phase of PCT Patent Application No. PCT/CN2023/104841 having International filing date of Jun. 30, 2023, which claims the benefit of priority of China Patent Application No. 202211358194.3 filed on Nov. 1, 2022. The contents of the above applications are all incorporated by reference as if fully set forth herein in their entirety.

TECHNICAL FIELD

The present disclosure relates to the field of display technologies, and in particular, to foldable display modules and foldable display devices.

BACKGROUND

In recent years, foldable display modules have become more and more popular. However, as a foldable screen of the display module is operated for a long time, an obvious crease is easily formed in a bending area of the foldable screen, which results in obvious uneven phenomenon on the bending area when the screen is black and displayed. The crease problem is affecting the further release of the market of the foldable display modules.

Therefore, there is an urgent need for foldable display modules and foldable display devices to relieve the above technical problems.

Technical Problems

The present disclosure provides foldable display modules and foldable display devices, which may relieve the current technical problem of a crease in a bending area of the foldable display module.

Technical Solutions

In order to solve the above problems, the technical solutions provided by the present disclosure are as follows:

The present disclosure provides a foldable display module, including at least one bending area and non-bending areas connected to the bending area, the bending area connected between two of the non-bending areas, the bending area including a first bending center line parallel to a first direction, and including:

a display panel;

a support plate, disposed on a side of the display panel, herein, the support plate includes a plurality of first hole groups and a plurality of second hole groups, each of extending directions of the first hole groups and the second hole groups is parallel to the first direction, the first hole groups and the second hole groups are alternately arranged along a second direction, and the second direction is arranged to form a preset angle with the first direction; each of the first hole groups includes a plurality of first via holes spaced along the first direction, each of the second hole groups includes a plurality of second via holes spaced along the first direction, and a length of each of the first via holes in the first direction is greater than a length of each of the second via holes in the first direction; and each of the first hole groups further includes first spacer parts each located between two adjacent ones of the first via holes; and in the second direction, the second via holes are arranged corresponding to the first spacer parts.

In some embodiments, the plurality of first via holes in each first hole group of the first hole groups includes two first kind holes disposed at both ends of the first hole group and one or more second kind holes disposed between the two first kind holes; each of the first kind holes includes a first part adjacent to a corresponding end of the first hole group and a second part away from the corresponding end of the first hole group; each of the second kind holes includes two third parts and a fourth part disposed between the two third parts, and the third parts and the fourth part are arranged along the first direction; and in the second direction, a maximum width of the first part is less than a minimum width of the second part, and a minimum width of each of the third parts is greater than a maximum width of the fourth part.

In some embodiments, in a same one of the first kind holes, in the second direction, a ratio of a maximum width of the second part to a minimum width of the first part ranges from 1.5 to 2; and in a same one of the second kind holes, in the second direction, a ratio of a maximum width of each of the third parts to a minimum width of the fourth part ranges from 1.5 to 2.

In some embodiments, each of the second via holes includes a fifth part corresponding to one of the first spacer parts and sixth parts located at both ends of the fifth part; and the fifth part and the sixth parts are arranged along the first direction, and in the second direction, a minimum width of the fifth part is greater than a maximum width of each of the sixth parts.

In some embodiments, in the first direction, a length of each of the sixth parts is less than a length of the second part corresponding thereto, and is less than a length of a corresponding one of the third parts.

In some embodiments, outer contours of ends of the second part, ends of the third parts, and ends of the sixth parts are arc shapes; and outer contours of connecting parts between the first part and the second part are arc shapes, outer contours of connecting parts between the third parts and the fourth part are arc shapes, and outer contours of connecting parts between the fifth part and the sixth parts are arc shapes.

In some embodiments, in at least one second hole group of the second hole groups, the fifth part of one of the second via holes adjacent to a center of the second hole group has a width in the second direction greater than a width of the fifth part of another one of the second via holes away from the center of the second hole group; and in at least one second hole group of the second hole groups, each of the sixth parts of one of the second via holes adjacent to the center of the second hole group has a length in the first direction greater than a length of each of the sixth parts of another one of the second via holes away from the center of the second hole group.

In some embodiments, in a same one second via hole of the second via holes, in the first direction, a ratio of a length of the second via hole to a length of the fifth part ranges from 12 to 15.

In some embodiments, in a same one of the second via holes, in the first direction, a ratio of a maximum width of the fifth part to a minimum width of each of the sixth parts ranges from 1.5 to 2.

In some embodiments, in at least one first hole group of the first hole groups, each of the third parts of one of the second kind holes adjacent to a center of the first hole group has a length in the first direction greater than a length of each of the third parts of another one of the second kind holes away from the center of the first hole group.

In some embodiments, in a same one second kind hole of the second kind holes, in the first direction, a ratio of a length of the second kind hole to a length of the fourth part ranges from 1.5 to 2.5.

In some embodiments, the bending area includes a first bending sub-area, a first planar sub-area located on a periphery of the first bending sub-area, and a second bending sub-area located on a periphery of the first planar sub-area, and the second bending sub-area is connected to the non-bending areas; the first bending center line is located in the first bending sub-area, the first hole groups and the second hole groups are located in the first bending sub-area; and the support plate further includes a plurality of third hole groups disposed in the second bending sub-area, an extending direction of each of the third hole groups is parallel to the first direction, and a hole depth of the third hole groups is less than a thickness of the support plate.

In some embodiments, the bending area further includes a second bending center line parallel to the first direction and located in the second bending sub-area; and in a direction towards the second bending center line, the hole depth of the third hole groups gradually increases.

In some embodiments, a distance between two adjacent ones of the third hole groups gradually decreases in the direction towards the second bending center line.

In some embodiments, the display panel includes a panel body, a polarization layer disposed on a light-emitting side of the panel body, a window cover disposed on a side of the polarization layer away from the panel body, and a backplate, disposed away from the light-emitting side of the panel body; and Herein, the support plate is located away from the light-emitting side of the panel body.

The present disclosure also provides a foldable display device, including a foldable display module, the foldable display module including at least one bending area and non-bending areas connected to the bending area, the bending area connected between two of the non-bending areas, the bending area including a first bending center line parallel to a first direction, and the foldable display module including:

a display panel;

a support plate, disposed on a side of the display panel, herein, the support plate includes a plurality of first hole groups and a plurality of second hole groups, each of extending directions of the first hole groups and the second hole groups is parallel to the first direction, the first hole groups and the second hole groups are alternately arranged along a second direction, and the second direction is arranged to form a preset angle with the first direction; each of the first hole groups includes a plurality of first via holes spaced along the first direction, each of the second hole groups includes a plurality of second via holes spaced along the first direction, and a length of each of the first via holes in the first direction is greater than a length of each of the second via holes in the first direction; and each of the first hole groups further includes first spacer parts each located between two adjacent ones of first via holes; and in the second direction, the second via holes are arranged corresponding to the first spacer parts.

In some embodiments, the plurality of first via holes in each first hole group of the first hole groups includes two first kind holes disposed at both ends of the first hole group and one or more second kind holes disposed between the two first kind holes;

each of the first kind holes includes a first part adjacent to a corresponding end of the first hole group and a second part away from the corresponding end of the first hole group;

each of the second kind holes includes two third parts and a fourth part disposed between the two third parts, and the third parts and the fourth part are arranged along the first direction; and in the second direction, a maximum width of the first part is less than a minimum width of the second part, and a minimum width of each of the third parts is greater than a maximum width of the fourth part.

In some embodiments, each of the second via holes includes a fifth part corresponding to one of the first spacer parts and sixth parts located at both ends of the fifth part; and the fifth part and the sixth parts are arranged along the first direction, and in the second direction, a minimum width of the fifth part is greater than a maximum width of each of the sixth parts.

In some embodiments, in at least one first hole group of the first hole groups, each of the third parts of one of the second kind holes adjacent to a center of the first hole group has a length in the first direction greater than a length of each of the third parts of another one of the second kind holes away from the center of the first hole group.

In some embodiments, the bending area includes a first bending sub-area, a first planar sub-area located on a periphery of the first bending sub-area, and a second bending sub-area located on a periphery of the first planar sub-area, and the second bending sub-area is connected to the non-bending areas;

the first bending center line is located in the first bending sub-area, the first hole groups and the second hole groups are located in the first bending sub-area; and the support plate further includes a plurality of third hole groups disposed in the second bending sub-area, an extending direction of each of the third hole groups is parallel to the first direction, and a hole depth of the third hole groups is less than a thickness of the support plate.

Beneficial Effects

Beneficial effects of the present disclosure: in the present disclosure, by defining via holes with different lengths in the bending area, the hole group having a longer length and the hole group having a shorter length are arranged alternately, and at the same time, the second via holes are arranged corresponding to the first spacer parts, so that a bending stress of the first spacer parts is further reduced and is released more evenly by the via holes having the shorter lengths. At the same time, the via holes having the shorter lengths reduce the removal material of the support plate and improve the support performance of the support plate. The alternating arrangement of the via holes having the longer lengths and the via holes having the shorter lengths increase the complexity of the hole arrangement, which makes the stress release paths more diverse, thus balancing the torsional stress and support rigidity of the support plate, releasing the bending stress more evenly, and making a folded segment of the foldable display module having a water-drop shape in a folded state closer to a circular shape, which further reduces the stress and makes the stress more uniform, so as to relieve the creases of the foldable display module.

EMBODIMENTS OF THE INVENTION

Figures 1, 2:
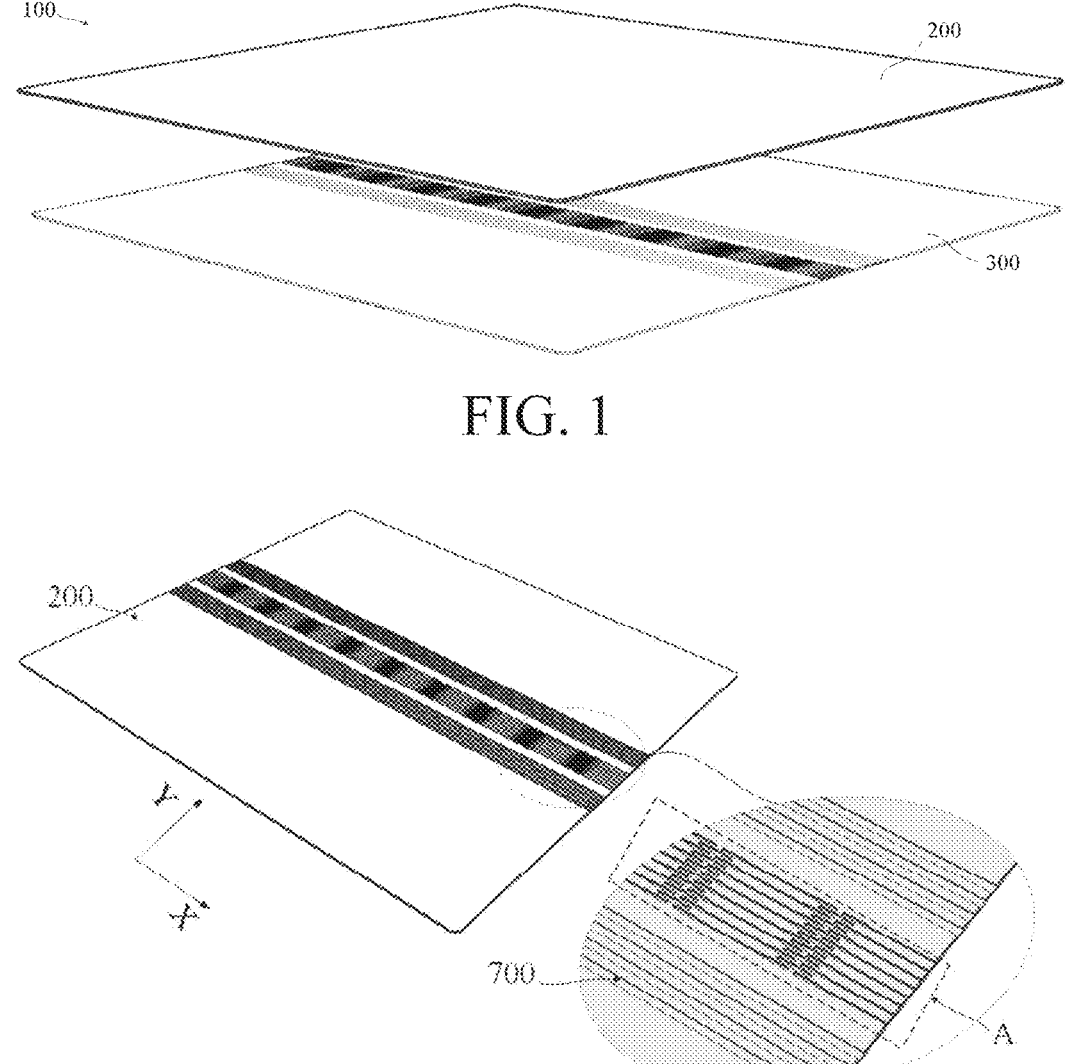
FIG. 1 is a schematic structural view of a foldable display module provided by embodiments of the present disclosure.
FIG. 2 is a schematic structural view of a support plate of the foldable display module provided by the embodiments of the present disclosure.
Figure 3:
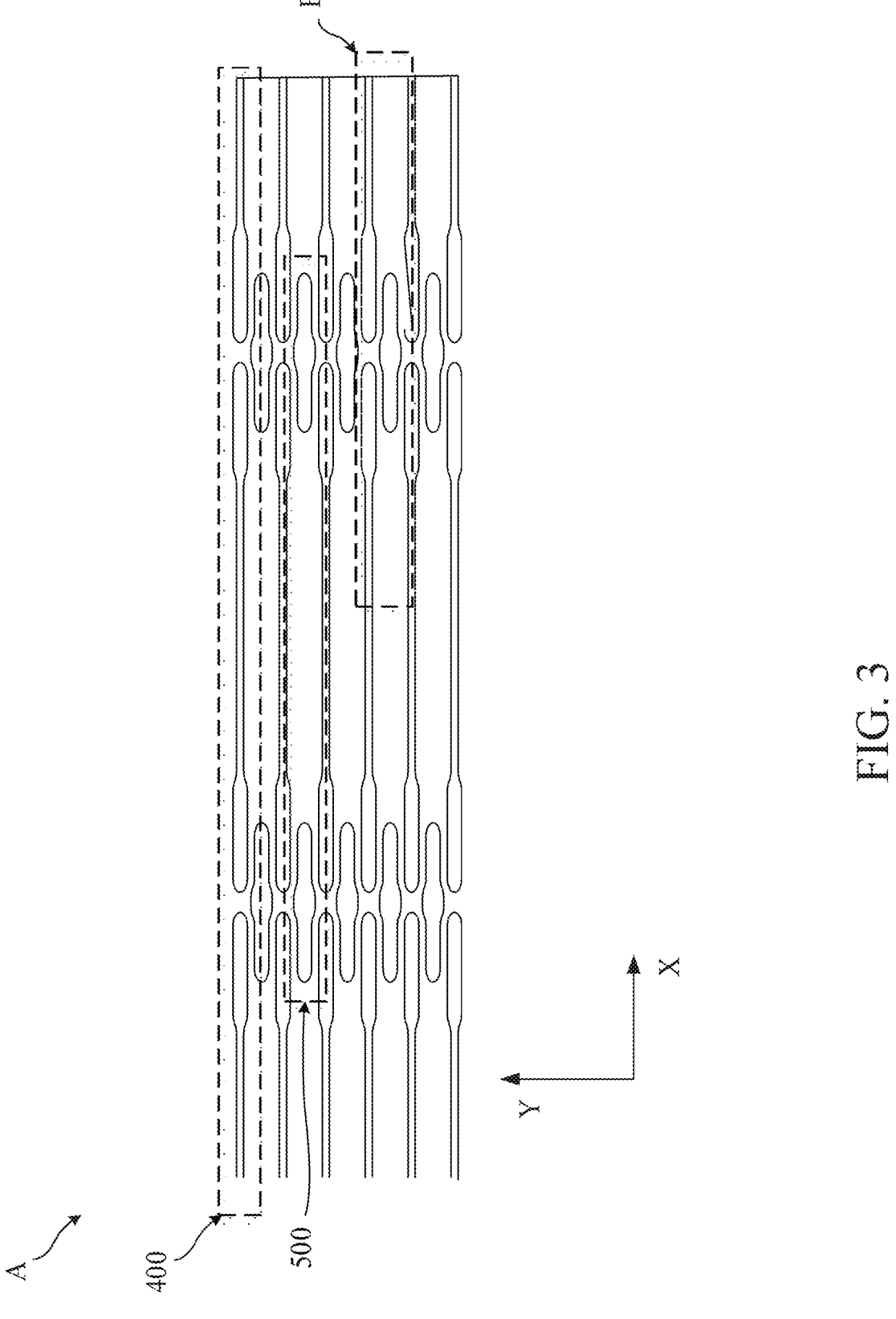
FIG. 3 is a partial enlarged view of area A in FIG. 2.

The present disclosure provides foldable display modules and foldable display devices. In order to make the purposes, technical solutions, and effects of the present disclosure clearer, the present disclosure will be further described in detail below with reference to the accompanying drawings and examples. It should be understood that specific embodiments described here are only used to explain the present disclosure and are not intended to limit the present disclosure.

Embodiments of the present disclosure provide foldable display modules and foldable display devices, each of which is explained in detail below. It should be noted that the order of description of the following embodiments does not limit the preferred order of the embodiments.

In recent years, foldable display modules have become more and more popular. However, as the foldable screen of the display module is operated for a long time, an obvious crease is easily formed in a bending area of the foldable screen, which results in obvious uneven phenomenon on the bending area when the screen is black and displayed. The crease problem is affecting the further release of the market of the foldable display modules.

Referring to FIGS. 1 to 12, embodiments of the present disclosure provide foldable display modules 100. The foldable display module 100 includes at least one bending area 110 and non-bending areas 120 connected to the bending area 110, the bending area 110 is connected between two non-bending areas 120 and includes a first bending center line 101 parallel to a first direction, and the foldable display module 100 includes:

a display panel 200; and a support plate 300, disposed on a side of the display panel 200;

herein, the support plate 300 includes a plurality of first hole groups 400 and a plurality of second hole groups 500, and each of extending directions of the first hole groups 400 and the second hole groups 500 is parallel to the first direction; the first hole groups 400 and the second hole groups 500 are alternately arranged along a second direction, and the second direction is arranged to form a preset angle with the first direction; each of the first hole groups 400 includes a plurality of first via holes 410 spaced along the first direction, each of the second hole groups 500 includes a plurality of second via holes 510 spaced along the first direction, and a length of the first via hole 410 in the first direction is greater than a length of the second via hole 510 in the first direction; and each of the first hole groups 400 also includes first spacer parts 420 each located between two adjacent first via holes 410, and in the second direction, the second via holes 510 are arranged corresponding to the first spacer parts 420.

In the present disclosure, by defining via holes with different lengths in the bending area, the hole group having a longer length and the hole group having a shorter length are arranged alternately, and at the same time, the second via holes are arranged corresponding to the first spacer parts, so that a bending stress of the first spacer parts is further reduced and is released more evenly by the via holes having the shorter lengths. At the same time, the via holes having the shorter lengths reduce the removal material of the support plate and improve the support performance of the support plate. The alternating arrangement of the via holes having the longer lengths and the via holes having the shorter lengths increase the complexity of the hole arrangement, which makes the stress release paths more diverse, thus balancing the torsional stress and support rigidity of the support plate, releasing the bending stress more evenly, and making a folded segment of the foldable display module having a water-drop shape in a folded state closer to a circular shape, which further reduces the stress and makes the stress more uniform, so as to relieve the creases of the foldable display module.

The technical solutions of the present disclosure will now be described with reference to specific embodiments.

In the embodiments, referring to FIGS. 1 to 4 and 9, the foldable display module 100 includes at least one bending area 110 and non-bending areas 120 connected to the bending area 110. The bending area 110 is connected between two non-bending areas 120. The bending area 110 includes a first bending center line 101 parallel to a first direction.

The foldable display module 100 includes a display panel 200 and a support plate 300 disposed on a side of the display panel 200. The support plate 300 includes a plurality of first hole groups 400 and a plurality of second hole groups 500. Each of extending directions of the first hole groups 400 and the second hole groups 500 is parallel to the first direction.

The first hole groups 400 and the second hole groups 500 are alternately arranged along a second direction, and the second direction is arranged to form a preset angle with the first direction. The first hole group 400 includes a plurality of first via holes 410 spaced apart along the first direction. The second hole group 500 includes a plurality of second via holes 510 spaced apart along the first direction. A length of the first via hole 410 in the first direction is greater than a length of the second via hole 510 in the first direction. The first hole group 400 also includes first spacer parts 420 each located between two adjacent first via holes 410. In the second direction, the second via holes 510 are arranged corresponding to the first spacer parts 420.

That the first direction is the X-axis and the second direction is the Y-axis is taken as an example for illustration. The first hole group 400 includes a plurality of first via holes 410 each extending along the X-axis direction. In the first hole group 400, there are the first spacer parts 420 each disposed between two adjacent first via holes. The first spacer part 420 is a solid material of the support plate 300, that is, an undrilled part. During a folding process, the torsional stress is mainly concentrated in the first spacer parts 420, and the torsional stress cannot be effectively released, so the second hole group 500 is provided between two adjacent first hole groups 400 in the second direction. The second hole group 500 includes a plurality of second via holes 510 each extending along the X-axis direction. In the Y-axis direction, the second via holes 510 are arranged corresponding to the first spacer parts 420.

If only the via holes located in the first hole groups 400 are provided in the first spacer parts 420, the arrangement of the holes will be too single, resulting in single stress release paths, and it will be impossible to release the complex torsional stress in all directions. The second via holes 510 are provided beside the first via holes 410 to be corresponding to the first spacer parts, which increases the complexity of the arrangement of the via holes and makes the stress release paths more diverse, thus releasing complex torsional stress and releasing the bending stress during the folding process more evenly, and making the folded segment of the foldable display module 100 having the water-drop shape in the folded state closer to a circular shape, which further reduces the stress and makes the stress more uniform, so as to relieve the creases of the foldable display module 100.

In some embodiments, referring to FIGS. 3 to 6, the plurality of first via holes 410 in the first hole group 400 include two first kind holes 431 disposed at both ends of the first hole group 400 and at least one second kind hole 432 disposed between the two first kind holes 431. Each of the first kind holes 431 includes a first part 610 adjacent to a corresponding end of the first hole group 400 and a second part 620 away from the corresponding end of the first hole group 400. The second kind hole 432 includes two third parts 630 and a fourth part 640 disposed between the two third parts 630, and the third parts 630 and the fourth part 640 are arranged along the first direction. In the second direction, a maximum width of the first part 610 is less than a minimum width of the second part 620, and a minimum width of the third part 630 is greater than a maximum width of the fourth part 640.

Widths of the first part 610 and the fourth part 640 are reduced to improve support and molding performances of the support material around the first part 610 and the fourth part 640 and ensure that the support plate 300 is not easily deformed or collapsed during the folding process. The widths of the third part 630 and the second part 620 are increased to reduce the torsional stress during the folding process, thereby balancing the uniform torsional stress and support rigidity, further increasing the complexity of the via holes, and making a digging profile of the support plate 300 cover more stress release directions, which allows the bending stress to be released in more directions, increases the release paths of the bending stress, and is conducive to the uniform release of the bending stress. In the folded state, the folded segment of the foldable display module 100 having the water-drop shape in the folded state may be closer to a circular shape, which further reduces the stress and makes the stress more uniform, so as to relieve the creases of the foldable display module 100.

In some embodiments, referring to FIGS. 3 to 6, the second via hole 510 includes a fifth part 650 corresponding to the first spacer part 420 and sixth parts 660 located at both ends of the fifth part 650, and the fifth part 650 and the sixth parts 660 are arranged along the first direction. In the second direction, a minimum width of the fifth part 650 is greater than a maximum width of the sixth part 660.

A width of the fifth part 650 corresponding to the first spacer part 420 is increased, thereby reducing the support material around the first spacer part 420 and reducing the torsional stress during the folding process. The support material is the carrier of stress release, the contour complexity of the support material between the fifth part 650 and the second part 620 and between the fifth part 650 and the third part 630 is increased, so that a digging profile of the support plate 300 covers more stress release directions, which allows the bending stress to be released in more directions, enhances the diversity of stress release paths, and enables the bending stress to be released more evenly. In the folded state, the folded segment of the foldable display module 100 having the water-drop shape in the folded state may be closer to a circular shape, which further reduces the stress and makes the stress more uniform, so as to relieve the creases of the foldable display module 100.

In some embodiments, an experimental group and a comparison group are set up, and a foldable experiment is performed under different experimental conditions of the support plate 300. The thicknesses of the support plates 300 in the comparison group and the experimental group are both 0.2 mm.

The condition of the comparison group is a support plate 300 with uniform openings in an array. The condition of the experimental group is that in the second direction, the maximum width of the first part 610 is less than the minimum width of the second part 620, the minimum width of the third part 630 is greater than the maximum width of the fourth part 640, and the minimum width of the fifth part 650 is greater than the maximum width of the sixth part 660.

Referring to FIGS. 9 to 12, simulation diagrams and stress measurements of the foldable display module 100 is performed in the final foldable state. In the stress comparison diagram shown in FIG. 12, the abscissa represents a path distance in millimeters between a measurement point and the first bending center line 101, and the ordinate represents a stress value in MPa.

Through comparison, it was found that the water-drop shape can be optimized by using the hole-cut structure in the present disclosure. That is, after the module is folded, the first bending sub-area 111 of the folded segment having the water-drop shape can be close to the circular shape from an elliptical shape. In this way, a central curvature of the water-drop shape is reduced and a radius is increased, thereby improving the stress on the module.

In the comparison group, due to the small curvature of the bending area 110 in the middle, an overall force is greater, and the bending shape of the water-drop shape of the screen cannot be adjusted. In the experimental group, the shape of the water-drop shape can be adjusted to increase the curvature of the bending area 110 in the middle, and the first bending sub-area 111 of the folded segment having the water-drop shape is closer to an arc shape, which may disperse stress, thereby making the stress on a window cover 230 of film layers in the module is significantly reduced, which is beneficial to reducing creases.

Figure 4:
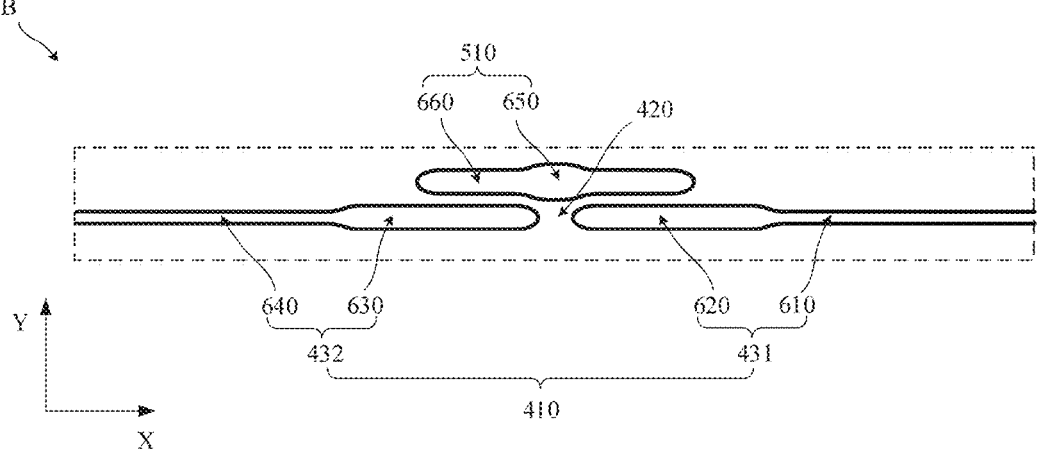
FIG. 4 is a partial enlarged view of area B in FIG. 3.
Figure 6:
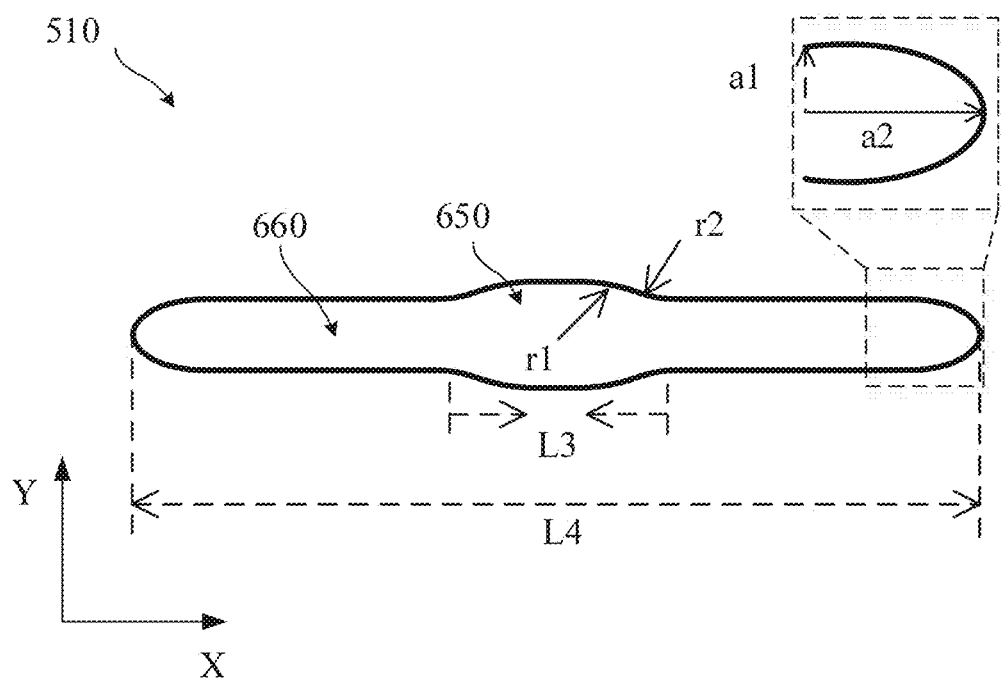
FIG. 6 is a partial enlarged view of a second via hole of the foldable display module provided by the embodiments of the present disclosure.
Figure 7:
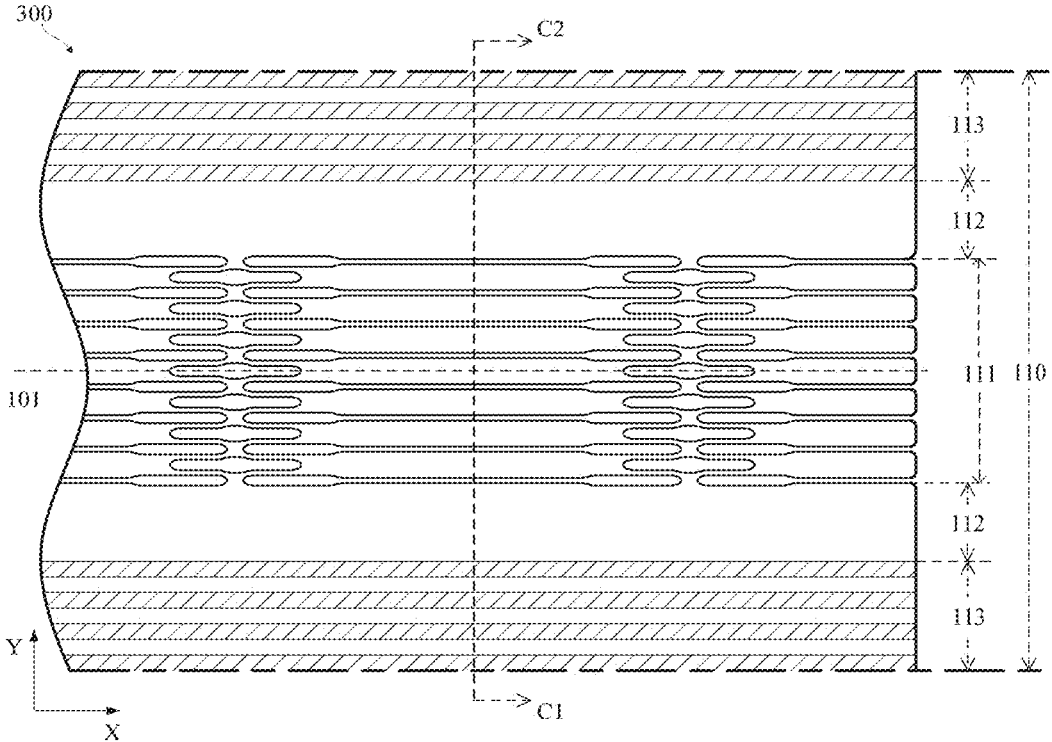
FIG. 7 is another structural schematic view of the support plate of the foldable display module provided by the embodiments of the present disclosure.

In some embodiments, referring to FIGS. 4 and 6, in the first direction, a length of the sixth part 660 is less than a length of the second part 620 corresponding thereto, and the length of the sixth part 660 is less than a length of the third part 630 corresponding thereto.

A main function of the first parts 610 and the fourth parts 640 is to provide better rigidity of the support plate 300 to ensure that the support plate 300 is not easily deformed and collapsed during the folding process. A main function of the second parts 620 and the third parts 630 is to reduce the torsional stress and improve the stress release uniformity, so the sixth part 660 should not extend to the first part 610 or the fourth part 640. That is, in the second direction, the second via hole 510 is not provided between two adjacent first parts 610, and the second via hole 510 is not provided between two adjacent fourth parts 640, thereby reducing the through hole rate of the bending area 110, which makes the bending area 110 have higher support to ensure the rigidity of the support plate 300, thereby preventing the support plate 300 from deforming and collapsing during the folding process, and reducing the creases of the foldable display module 100.

Figure 5:
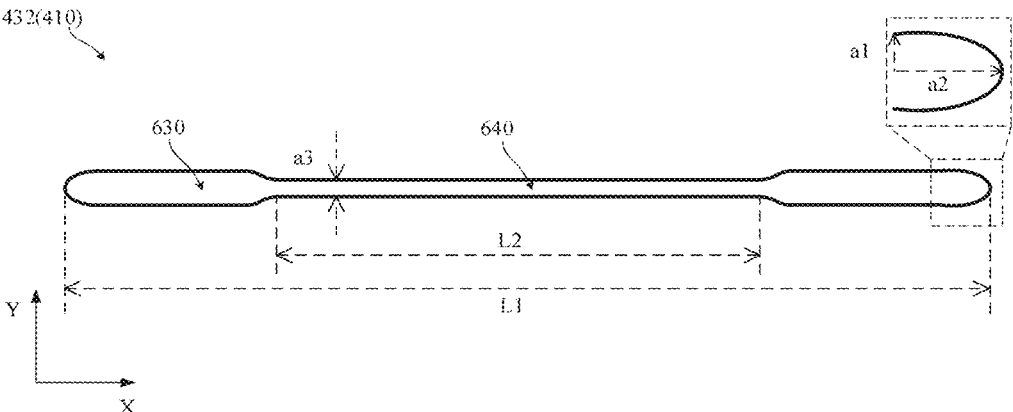
FIG. 5 is a partial enlarged view of a second kind hole of the foldable display module provided by the embodiments of the present disclosure.

In some embodiments, referring to FIGS. 4 to 6, outer contours of ends of the second part 620, ends of the third part 630, and ends of the sixth part 660 are arc shapes. Outer contours of connecting parts between the first part 610 and the second part 620 are arc shapes, outer contours of connecting parts between the third part 630 and the fourth part 640 are arc shapes, and outer contours of connecting parts between the fifth part 650 and the sixth part 660 are arc shapes.

The arc shape is conducive to the uniform release of stress. At the same time, under a condition of the same circumference, an area of the arc shape is greater than an area of the linear shape, which may increase an area of the holes, further reduce the torsional stress, reduce the risk of stress concentration, and improve the stress release uniformity. The arc shape may be circular or elliptical, and here is only an example without any specific limitation.

In some embodiments, referring to FIGS. 4 to 6, outer contours of connecting parts between the first part 610 and the second part 620 are arc shapes, outer contours of connecting parts between the third part 630 and the fourth part 640 are arc shapes, and outer contours of connecting parts between the fifth part 650 and the sixth part 660 are arc shapes. an area of the arc shape is greater than an area of the linear shape, which may increase an area of the holes, further reduce the torsional stress, reduce the risk of stress concentration, and improve the stress release uniformity. The arc shape may be any one or a combination of two or more of a circle, an ellipse, a quadratic curve, a parabola. Here is only an example without specific limitations. For example, the arc shape may be composed of two elliptical arcs r1 and r2.

In some embodiments, in the same first kind hole 431, in the second direction, a ratio of a maximum width of the second part 620 to a minimum width of the first part 610 ranges from 1.5 to 2. Too large or too small ratio may lead to the imbalance between stress release performance and support rigidity, affect the performance parameters of the support plate 300, and lead to obvious creases.

In some embodiments, in the same second kind hole 432, in the second direction, a ratio of a maximum width of the third part 630 to a minimum width of the fourth part 640 ranges from 1.5 to 2. Too large or too small ratio may lead to the imbalance between stress release performance and support rigidity, affect the performance parameters of the support plate 300, and lead to obvious creases.

In some embodiments, in the same second via hole 510, in the second direction, a ratio of a maximum width of the fifth part 650 to a minimum width of the sixth part 660 ranges from 1.5 to 2. Too large or too small ratio may lead to the imbalance between stress release performance and support rigidity, affect the performance parameters of the support plate 300, and lead to obvious creases.

In some embodiments, referring to FIG. 5, in the second direction, the width of the first part 610 ranges from 0.1 mm to 0.15 mm, and the width a3 of the fourth part 640 ranges from 0.1 mm to 0.15 mm. The value ranges may effectively relieve stress and provide strong support rigidity. The width of the first part 610 is similar to the width of the fourth part 640, and the drawings are not repeated.

In some embodiments, in the first direction, a ratio of a length of the second kind hole 432 to a length of the second via hole 510 ranges from 2 to 5. Too large or too small ratio may lead to the imbalance between stress release performance and support rigidity, affect the performance parameters of the support plate 300, and lead to obvious creases.

In some embodiments, referring to FIGS. 5 and 6, the outer contours of the ends of the second part 620, the ends of the third part 630, and the ends of the sixth part 660 are semi-elliptical shape, in which a ratio of a major semi-axis a2 to a minor semi-axis a1 ranges from 2 to 3. Too large or too small ratio may lead to the imbalance between stress release performance and support rigidity, affect the performance parameters of the support plate 300, and lead to obvious creases.

In some embodiments, referring to FIG. 5, in the same second kind hole 432, in the first direction, a ratio of a length L1 of the second kind hole 432 to a length L2 of the fourth part 640 ranges from 1.5 to 2.5.

Regarding the ratio of the lengths of the two parts of the second kind hole 432, certain restrictions are required, and the restriction rules are as follows.

Regarding the relationship between the length of the hole and the stress, it is a design parameter related to the material of the support plate 300. Generally, the material of the support plate 300 is SUS stainless steel, and its yield strength is about 1600 MPa. Because the fatigue strength is generally about 0.5 times the yield strength, the fatigue strength of 800 MPa is designed as a basis stress as a reference. The ratio of the lengths is determined through simulation, as shown in Table 1 below, which is a simulation comparison table between the ratio of L1 and L2 and the stress.

TABLE 1

| Ratio | Stress/MPa |
|---|---|
| L1/L2 = 0.5 | 1080.3 |
| L1/L2 = 0.75 | 980.1 |
| L1/L2 = 1 | 960.5 |
| L1/L2 = 1.25 | 870.1 |
| L1/L2 = 1.5 | 760.8 |

TABLE 1-continued

| Ratio | Stress/MPa |
|---|---|
| L1/L2 = 1.75 | 636.3 |
| L1/L2 = 2 | 617.8 |
| L1/L2 = 2.25 | 513.9 |
| L1/L2 = 2.5 | 418.9 |

Regarding the relationship between length of the hole and the support performance, the calibration is done by checking the ratio of the lengths of the hole and a rebound force obtained through simulation after bending. The rebound force reflects the support performance to a certain extent, and its determination mainly depends on two aspects of fatigue stress intensity and the elasticity of the closed module. Theoretically, the larger the rebound force, the better the support performance, the less likely it is to bend, and the larger the stress. However, if the rebound force is too large, it will not be easy to close the screen after the moulde is folded, so it needs to provide, for example, a magnet to a middle frame of the foldable display device, and a size of the magnet is directly related to the rebound force. Generally, an ultimate force of the magnet is about 4N, so the rebound force of 4N is designed as a basis rebound force as a reference, and the ratio of the lengths is determined through simulation, as shown in Table 2 below, which is a simulation comparison table between the ratio of L1 and L2 and the rebound force.

TABLE 2

| Ratio | Rebound force/N |
|---|---|
| L1/L2 = 0.5 | 4.8 |
| L1/L2 = 0.75 | 4.73 |
| L1/L2 = 1 | 4.23 |
| L1/L2 = 1.25 | 3.93 |
| L1/L2 = 1.5 | 3.56 |
| L1/L2 = 1.75 | 3.23 |
| L1/L2 = 2 | 2.95 |
| L1/L2 = 2.25 | 2.66 |
| L1/L2 = 2.5 | 1.96 |

Too large or too small ratio of L1/L2 may lead to the imbalance between stress release performance and support rigidity, affect the performance parameters of the support plate 300, and lead to obvious creases. Therefore, the ratio of L1/L2 is selected to range from 1.5 to 2.5 to balance the support rigidity and bendability of the support plate 300 while complying with product shipping standards.

In some embodiments, referring to FIG. 6, in the same second via hole 510, in the first direction, a ratio of a length L4 of the second via hole 510 to a length L3 of the fifth part 650 ranges from 12 to 15.

Regarding the ratio of the lengths of the two parts of the second via hole 510, there are also certain restrictions. For the restriction rules, referring to the limiting rules of the ratio of L1/L2. The simulation results between the ratio of L4/L3 and stress can be referred to Table 3, and the simulation results between the ratio of L4/L3 and the rebound force can be referred to Table 4.

TABLE 3

| Ratio | Stress/MPa |
|---|---|
| L4/L3 = 6 | 1060.3 |
| L4/L3 = 8 | 986.1 |
| L4/L3 = 10 | 920.5 |

TABLE 3-continued

| Ratio | Stress/MPa |
|---|---|
| L4/L3 = 12 | 790.1 |
| L4/L3 = 14 | 760.8 |
| L4/L3 = 16 | 801.3 |
| L4/L3 = 18 | 837.8 |
| L4/L3 = 20 | 913.9 |

TABLE 4

| Ratio | Rebound force/N |
|---|---|
| L1/L2 = 0.5 | 4.72 |
| L1/L2 = 0.75 | 4.53 |
| L1/L2 = 1 | 4.13 |
| L1/L2 = 1.25 | 3.63 |
| L1/L2 = 1.5 | 3.57 |
| L1/L2 = 1.75 | 3.33 |
| L1/L2 = 2 | 2.85 |
| L1/L2 = 2.25 | 2.56 |
| L1/L2 = 2.5 | 4.72 |

Too large or too small ratio of L4/L3 may lead to the imbalance between stress release performance and support rigidity, affect the performance parameters of the support plate 300, and lead to obvious creases. Therefore, the ratio of L4/L3 is selected to range from 12 to 15 to balance the support rigidity and bendability of the support plate 300 while complying with product shipping standards.

The radios illustrated in the figures are only for illustration, and specific radios can be referred to the specific data above.

In some embodiments, in the first direction, a ratio of the length of the first kind hole 431 to the length of the second kind hole 432 ranges from ½ to ⅔.

Figure 9:
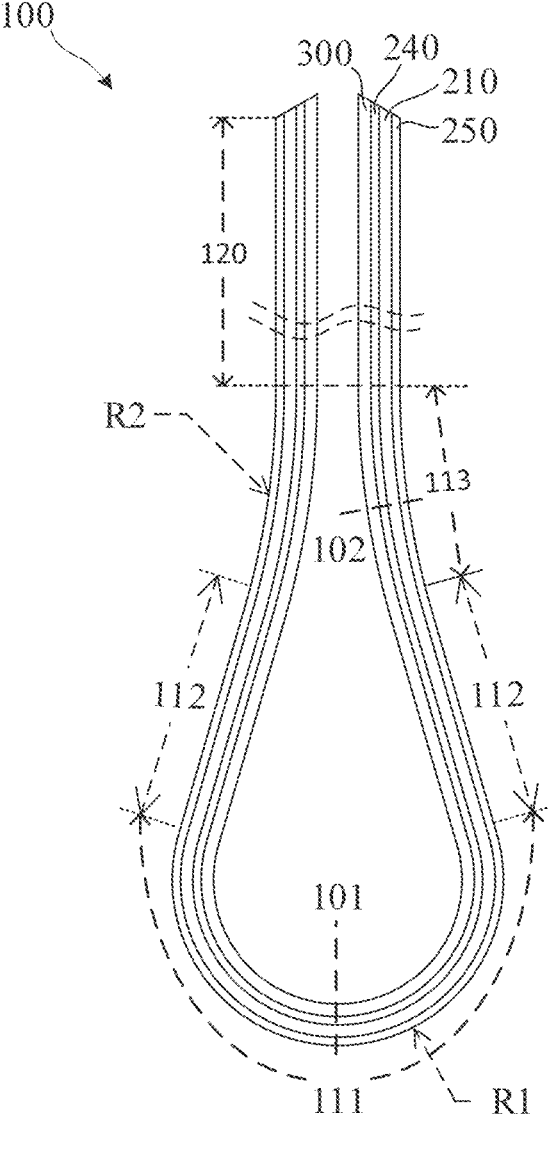
FIG. 9 is another structural schematic view of the foldable display module provided by the embodiments of the present disclosure.
Figure 10:
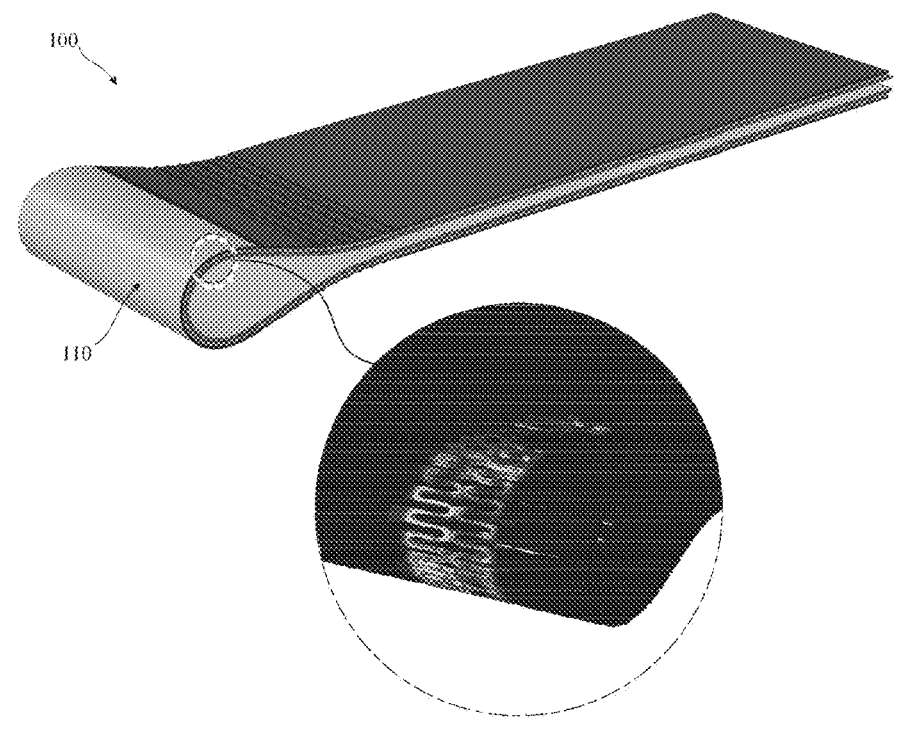
FIG. 10 is a simulation diagram of the foldable display module provided by the embodiments of the present disclosure.
Figure 11:
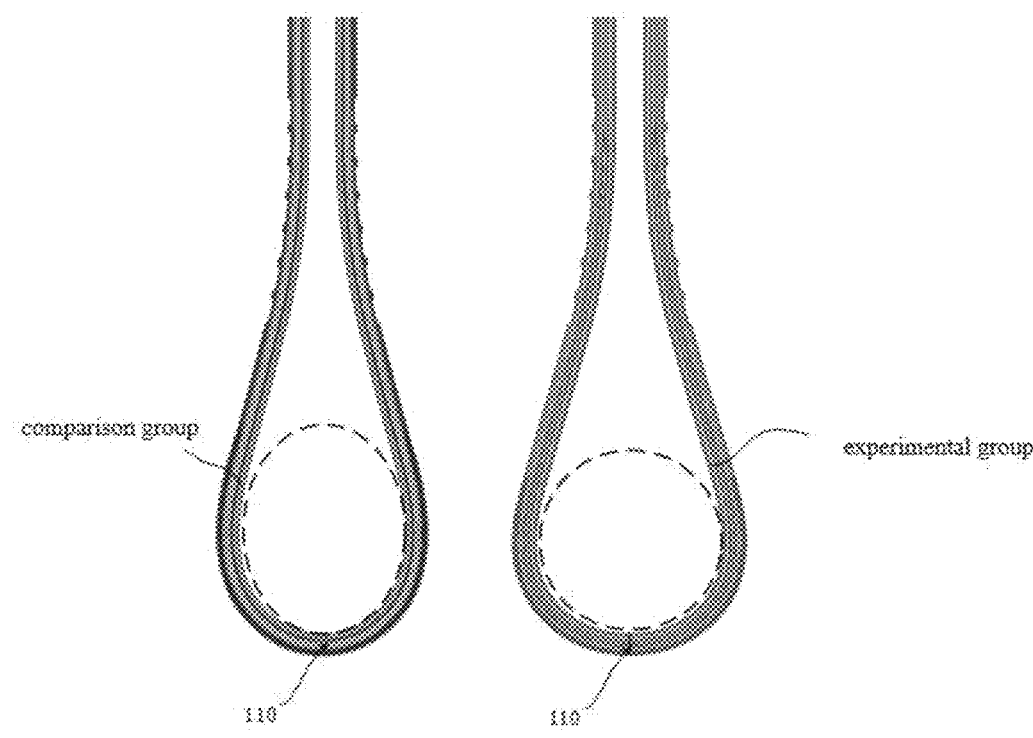
FIG. 11 is a schematic diagram of a foldable simulation comparison of the foldable display module provided by the embodiments of the present disclosure.
Figure 12:
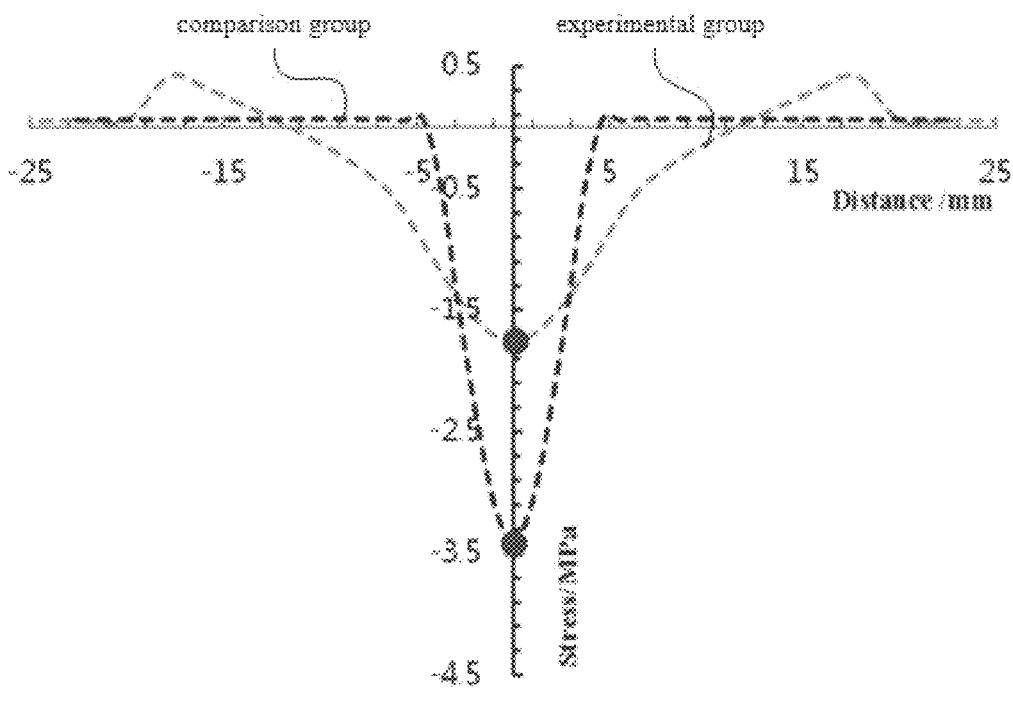
FIG. 12 is a comparative experimental characterization diagram of the foldable display module provided by the embodiments of the present disclosure.

In some embodiments, referring to FIG. 9 and FIG. 11, an average value of the above radio parameters is taken as an experimental value for experiments. By optimizing the above structural features and the combination relationship of each dimension, combined with the mechanical simulation method, the above dimensional parameters are adjusted, and each dimension is controlled within the above range, so as to control a bending shape of the water-drop shape of the foldable screen in the folded state, thus making a middle bending arc segment R1 of the first bending sub-area 111 of the bending area 110 in a circular state, which may reduce or uniform the stress, and overall reduce the stress and strain at the bending part of the module to reduce creases.

In some embodiments, in at least one of the second hole groups 500, the fifth part 650 of the second via hole 510 adjacent to the center of the second hole group 500 has a width in the second direction greater than a width of the fifth part 650 of the second via hole 510 away from the center of the second hole group 500. In at least one of the second hole groups 500, the sixth part 660 of the second via hole 510 adjacent to the center of the second hole group 500 has a length in the first direction greater than a length of the sixth part 660 of the second via hole 510 away from the center of the second hole group 500.

In a direction from an end of the second hole group 500 to the center of the second hole group 500, the further away from the end of the second hole group 500, the more complex the cross change of the bending stress becomes. When a hole rate of the second kind hole group 500 is increased, the material of the support plate 300 between the fifth part 650 and the third part 630 is reduced, the bending performance of the support plate 300 is improved, and the outline complexity of the support plate between the fifth part 650 and the third part 630 is increased at the same time, so that the digging profile of the support plate 300 can cover more stress release directions, which allows the bending stress to be released in more directions, enhances the diversity of stress release paths, and enables the bending stress to be released more evenly. In the folded state, the folded segment of the foldable display module 100 having the water-drop shape in the folded state may be closer to a circular shape, which further reduces the stress and makes the stress more uniform, so as to relieve the creases of the foldable display module 100.

In some embodiments, in at least one first hole group 400, the third part 630 of the second kind hole 432 adjacent to the center of the first hole group 400 has a length in the first direction greater than a length of the third part 630 of the second kind hole 432 away from the center of the first hole group 400.

In a direction from an end of the first hole group 400 to the center of the first hole group 400, the closer to the center of the first hole group 400, the longer the third part 630 is, the shorter the four part 640 is, the higher the hole rate of the first kind hole group 400 is, and the stronger the bending performance of the support plate 300 is, which may release more bending stress to relieve the creases of the foldable display module 100.

Figure 8:
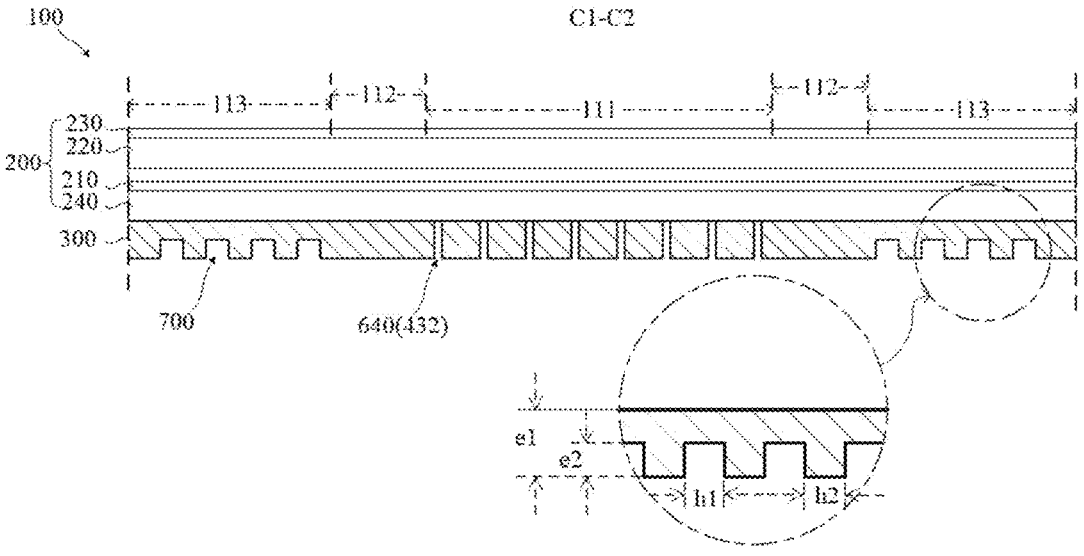
FIG. 8 is a schematic structural view of FIG. 7 along a C1-C2 section.

In some embodiments, referring to FIGS. 2, 8, and 9, the bending area 110 includes a first bending sub-area 111, a first planar sub-area 112 located on a periphery of the first bending sub-area 111, and a second bending sub-area 113 located on a periphery of the first planar sub-area 112. The second bending sub-area 113 is connected to the non-bending area 120. The first bending center line 101 is located in the first bending sub-area 111, and the first hole groups 400 and the second hole groups 500 are located in the first bending sub-area 111. The support plate 300 further includes a plurality of third hole groups 700 disposed in the second bending sub-area 113, and an extending direction of each third hole group 700 is parallel to the first direction. A hole depth of the third hole group 700 is less than the thickness of the support plate 300.

When the foldable display module 100 is in the folded state, a shape of the bending area 110 is the water-drop shape. The bottom of the water-drop shape has an arc segment R1 corresponding to the first bending sub-area 111, and there is an arc segment R2 at the top of the water-drop shape corresponding to the second bending sub-area 113, which assists folding and releases the bending stress. Since a curvature of the bending arc in the second bending sub-area 113 is small, so that there is no need to provide via holes, and the third hole group 700 is provided with half-etched holes to provide enhanced bending performance while retaining more rigid support performance.

In some embodiments, referring to FIG. 9, the bending area 110 further includes a second bending center line 102 parallel to the first direction and located in the second bending sub-area 113. In a direction towards the second bending center line 102, a hole depth of the third hole group 700 gradually increases.

The closer to the second bending center line 102, the larger the bending curve, and the larger the hole depth of the third hole group 700, which may provide stronger bending performance and release more bending stress, thereby relieving the creases of the foldable display module 100.

In some embodiments, a distance between two adjacent third hole groups 700 gradually decreases in the direction towards the second bending center line 102.

The closer to the second bending center line 102, the larger the bending curve, the higher the arrangement density of the third hole groups 700, the higher the hole rate, which may provide stronger bending performance and release more bending stress, thereby relieving the creases of the foldable display module 100.

In some embodiments, a ratio of the hole depth of the third hole group 700 to the thickness of the support plate 300 ranges from ½ to ⅔. Too large or too small ratio may lead to the imbalance between stress release performance and support rigidity, affect the performance parameters of the support plate 300, and lead to obvious creases.

In some embodiments, a ratio of a hole width of the third hole group 700 to the distance between two adjacent third hole groups 700 ranges from 1 to 5. Too large or too small ratio may lead to the imbalance between stress release performance and support rigidity, affect the performance parameters of the support plate 300, and lead to obvious creases.

In some embodiments, the hole width of the third hole group 700 ranges from 0.25 mm to 0.5 mm. This value range may effectively relieve stress and provide strong support rigidity.

In some embodiments, referring to FIGS. 8 and 9, the display panel 200 includes a panel body 210, a polarization layer 220 disposed on a light-emitting side of the panel body 210, and a window cover 230 disposed on a side of the polarization layer 220 away from the panel body 210, and a backplate 240 disposed away from the light-emitting side of the panel body 210. For convenience of drawing, in FIG. 9, the polarization layer 220 and the window cover 230 are represented by a combined film layer 250.

In some embodiments, referring to FIGS. 8 and 9, the support plate 300 is located away from the light-emitting side of the panel body 210.

In some embodiments, the material of the support plate 300 is any one of steel sheets, titanium alloys, carbon fibers, and polymer composite materials. Here is only an example and is not specifically limited.

In some embodiments, the thickness of the support plate 300 ranges from 0.1 mm to 0.2 mm to balance the hole rate and support performance.

In the present disclosure, by defining via holes with different lengths in the bending area, the hole group having a longer length and the hole group having a shorter length are arranged alternately, and at the same time, the second via holes are arranged corresponding to the first spacer parts, so that a bending stress of the first spacer parts is further reduced and is released more evenly by the via holes having the shorter lengths. At the same time, the via holes having the shorter lengths reduce the removal material of the support plate and improve the support performance of the support plate, thus balancing the torsional stress and support rigidity of the support plate, releasing the bending stress more evenly, and making a folded segment of the foldable display module having a water-drop shape in a folded state closer to a circular shape, which further reduces the stress and makes the stress more uniform, so as to relieve the creases of the foldable display module.

Figure 13:
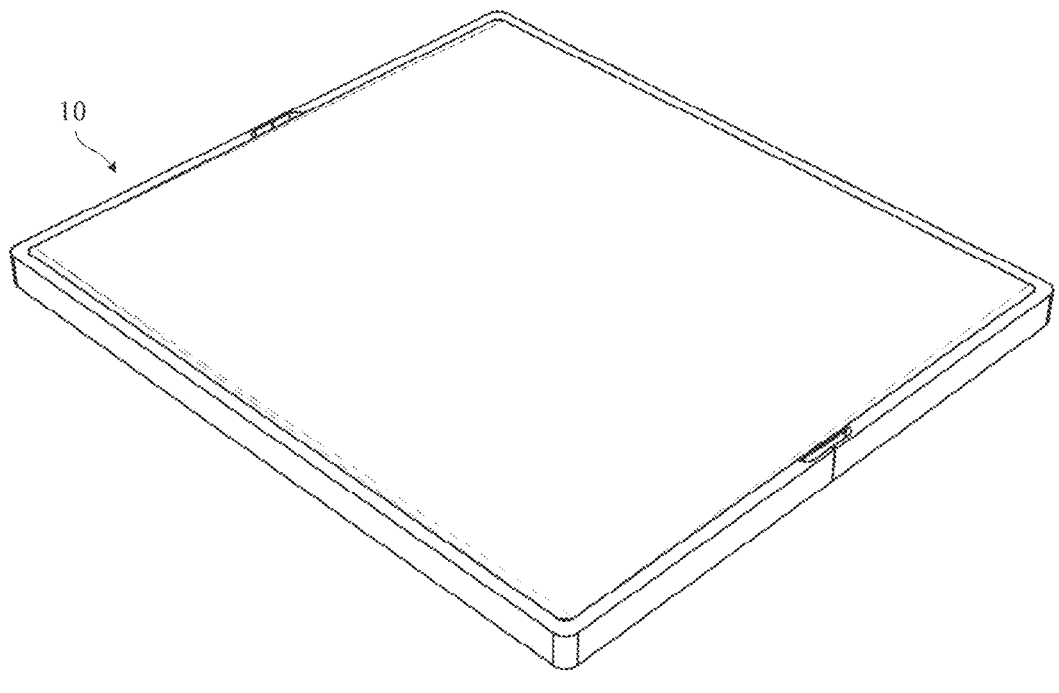
FIG. 13 is a schematic structural view of a foldable display device provided by embodiments of the present disclosure.
Figure 14:
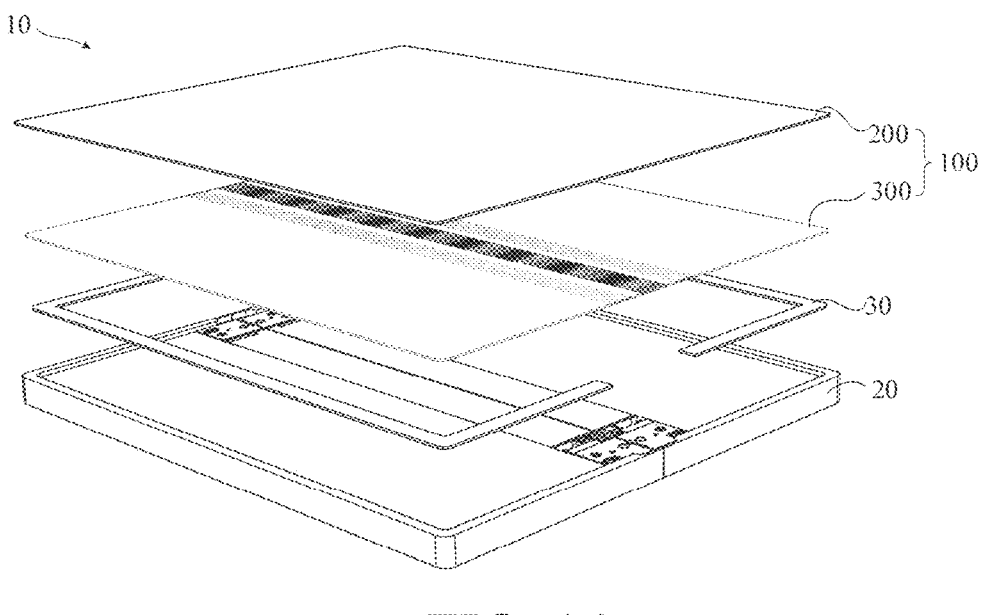
FIG. 14 is a schematic exploded structural view of the foldable display device provided by the embodiments of the present disclosure.

Referring to FIGS. 13 and 14, embodiments of the present disclosure further provides foldable display devices 10. The foldable display device 10 includes any one of the above foldable display modules 100.

In some embodiments, the foldable display device 10 further includes a device body 20, and the foldable display module 100 is integrated with the device body 20.

The specific structure of the foldable display module 100 can be referred to any one of the above-mentioned embodiments of the foldable display modules 100 and the accompanying drawings, and will not be repeated here.

In the embodiments, the device body 20 may include a middle frame, a frame glue, external components, a hinge, etc., and the foldable display device 10 may be a display terminal such as a mobile phone, a tablet, or a television, which is not limited here.

In some embodiments, the support plate 300 corresponding to the first planar sub-area 112 may be used to be glued to a floating plate structure of the hinge.

In some embodiments, the foldable display device 10 corresponding further includes an adhesive layer 30.

Embodiments of the present disclosure disclose foldable display modules and foldable display devices. The foldable display module includes a display panel and a support plate. The support plate includes a plurality of first hole groups and a plurality of second hole groups. The first hole groups and the second hole groups are alternately arranged along the second direction. The first hole group includes a plurality of first via holes, the second hole group includes a plurality of second via holes, a length of the first via hole in the first direction is greater than a length of the second via hole in the first direction, and the second via holes are arranged corresponding to the first spacer parts each disposed between two adjacent first via holes. In the present disclosure, via holes with different lengths are provided and arranged alternately in the bending area, the bending stress of the first spacer parts is reduced by the via holes having the shorter lengths, and the via holes having the shorter lengths reduce the removal material of the support plate, improve the support performance of the support plate, increase the complexity of the arrangement of the via holes, make the stress release paths more diverse, balance the torsional stress and support rigidity of the support plate, and make the bending arc segment in the folded state closer to the circular shape.

It can be understood that, for those of ordinary skill in the art, equivalent substitutions or changes may be made based on the technical solutions and inventive concepts of the present disclosure, and all such changes or substitutions should fall within the protection scope of the appended claims of the present disclosure.

The invention claimed is:

1. A foldable display module, comprising at least one bending area and non-bending areas connected to the bending area, the bending area connected between two of the non-bending areas, the bending area comprising a first bending center line parallel to a first direction, and comprising:

a display panel;

a support plate, disposed on a side of the display panel, wherein the support plate comprises a plurality of first hole groups and a plurality of second hole groups, each of extending directions of the first hole groups and the second hole groups is parallel to the first direction, the first hole groups and the second hole groups are alternately arranged along a second direction, and the second direction is arranged to form a preset angle with the first direction; each of the first hole groups comprises a plurality of first via holes spaced along the first direction, each of the second hole groups comprises a plurality of second via holes spaced along the first direction, and a length of each of the first via holes in the first direction is greater than a length of each of the second via holes in the first direction; and each of the first hole groups further comprises first spacer parts each located between two adjacent ones of the first via holes; and in the second direction, the second via holes are arranged corresponding to the first spacer parts;

wherein the plurality of first via holes in each first hole group of the first hole groups comprises two first kind holes disposed at both ends of the first hole group and one or more second kind holes disposed between the two first kind holes;

each of the first kind holes comprises a first part adjacent to a corresponding end of the first hole group and a second part away from the corresponding end of the first hole group;

each of the second kind holes comprises two third parts and a fourth part disposed between the two third parts, and the third parts and the fourth part are arranged along the first direction; and in the second direction, a maximum width of the first part is less than a minimum width of the second part, and a minimum width of each of the third parts is greater than a maximum width of the fourth part.

2. The foldable display module according to claim 1, wherein in a same one of the first kind holes, in the second direction, a ratio of a maximum width of the second part to a minimum width of the first part ranges from 1.5 to 2; and in a same one of the second kind holes, in the second direction, a ratio of a maximum width of each of the third parts to a minimum width of the fourth part ranges from 1.5 to 2.

3. The foldable display module according to claim 1, wherein each of the second via holes comprises a fifth part corresponding to one of the first spacer parts and sixth parts located at both ends of the fifth part; and the fifth part and the sixth parts are arranged along the first direction, and in the second direction, a minimum width of the fifth part is greater than a maximum width of each of the sixth parts.

4. The foldable display module according to claim 3, wherein in the first direction, a length of each of the sixth parts is less than a length of the second part corresponding thereto, and is less than a length of a corresponding one of the third parts.

5. The foldable display module according to claim 3, wherein outer contours of ends of the second part, ends of the third parts, and ends of the sixth parts are arc shapes; and outer contours of connecting parts between the first part and the second part are arc shapes, outer contours of connecting parts between the third parts and the fourth part are arc shapes, and outer contours of connecting parts between the fifth part and the sixth parts are arc shapes.

6. The foldable display module according to claim 3, wherein in at least one second hole group of the second hole groups, the fifth part of one of the second via holes adjacent to a center of the second hole group has a width in the second direction greater than a width of the fifth part of another one of the second via holes away from the center of the second hole group; and in at least one second hole group of the second hole groups, each of the sixth parts of one of the second via holes adjacent to the center of the second hole group has a length in the first direction greater than a length of each of the sixth parts of another one of the second via holes away from the center of the second hole group.

7. The foldable display module according to claim 3, wherein in a same one second via hole of the second via holes, in the first direction, a ratio of a length of the second via hole to a length of the fifth part ranges from 12 to 15.

8. The foldable display module according to claim 3, wherein in a same one of the second via holes, in the first direction, a ratio of a maximum width of the fifth part to a minimum width of each of the sixth parts ranges from 1.5 to 2.

9. The foldable display module according to claim 1, wherein in at least one first hole group of the first hole groups, each of the third parts of one of the second kind holes adjacent to a center of the first hole group has a length in the first direction greater than a length of each of the third parts of another one of the second kind holes away from the center of the first hole group.

10. The foldable display module according to claim 1, wherein in a same one second kind hole of the second kind holes, in the first direction, a ratio of a length of the second kind hole to a length of the fourth part ranges from 1.5 to 2.5.

11. The foldable display module according to claim 1, wherein the bending area comprises a first bending sub-area, a first planar sub-area located on a periphery of the first bending sub-area, and a second bending sub-area located on a periphery of the first planar sub-area, and the second bending sub-area is connected to the non-bending areas;

the first bending center line is located in the first bending sub-area, the first hole groups and the second hole groups are located in the first bending sub-area; and the support plate further comprises a plurality of third hole groups disposed in the second bending sub-area, an extending direction of each of the third hole groups is parallel to the first direction, and a hole depth of the third hole groups is less than a thickness of the support plate.

12. The foldable display module according to claim 11, wherein the bending area further comprises a second bending center line parallel to the first direction and located in the second bending sub-area; and in a direction towards the second bending center line, the hole depth of the third hole groups gradually increases.

13. The foldable display module according to claim 12, wherein a distance between two adjacent ones of the third hole groups gradually decreases in the direction towards the second bending center line.

14. The foldable display module according to claim 1, wherein the display panel further comprises:

a panel body;

a polarization layer, disposed on a light-emitting side of the panel body;

a window cover, disposed on a side of the polarization layer away from the panel body; and a backplate, disposed away from the light-emitting side of the panel body, wherein the support plate is located away from the light-emitting side of the panel body.

15. A foldable display device, comprising a foldable display module, the foldable display module comprising at least one bending area and non-bending areas connected to the bending area, the bending area connected between two of the non-bending areas, the bending area comprising a first bending center line parallel to a first direction, and the foldable display module comprising:

a display panel;

a support plate, disposed on a side of the display panel, wherein the support plate comprises a plurality of first hole groups and a plurality of second hole groups, each of extending directions of the first hole groups and the second hole groups is parallel to the first direction, the first hole groups and the second hole groups are alternately arranged along a second direction, and the second direction is arranged to form a preset angle with the first direction; each of the first hole groups comprises a plurality of first via holes spaced along the first direction, each of the second hole groups comprises a plurality of second via holes spaced along the first direction, and a length of each of the first via holes in the first direction is greater than a length of each of the second via holes in the first direction; and each of the first hole groups further comprises first spacer parts each located between two adjacent ones of the first via holes; and in the second direction, the second via holes are arranged corresponding to the first spacer parts;

wherein the plurality of first via holes in each first hole group of the first hole groups comprises two first kind holes disposed at both ends of the first hole group and one or more second kind holes disposed between the two first kind holes;

each of the first kind holes comprises a first part adjacent to a corresponding end of the first hole group and a second part away from the corresponding end of the first hole group;

each of the second kind holes comprises two third parts and a fourth part disposed between the two third parts, and the third parts and the fourth part are arranged along the first direction; and in the second direction, a maximum width of the first part is less than a minimum width of the second part, and a minimum width of each of the third parts is greater than a maximum width of the fourth part.

16. The foldable display device according to claim 15, wherein each of the second via holes comprises a fifth part corresponding to one of the first spacer parts and sixth parts located at both ends of the fifth part; and the fifth part and the sixth parts are arranged along the first direction, and in the second direction, a minimum width of the fifth part is greater than a maximum width of each of the sixth parts.

17. The foldable display device according to claim 15, wherein in at least one first hole group of the first hole groups, each of the third parts of one of the second kind holes adjacent to a center of the first hole group has a length in the first direction greater than a length of each of the third parts of another one of the second kind holes away from the center of the first hole group.

18. The foldable display device according to claim 15, wherein the bending area comprises a first bending sub-area, a first planar sub-area located on a periphery of the first bending sub-area, and a second bending sub-area located on a periphery of the first planar sub-area, and the second bending sub-area is connected to the non-bending areas;

the first bending center line is located in the first bending sub-area, the first hole groups and the second hole groups are located in the first bending sub-area; and the support plate further comprises a plurality of third hole groups disposed in the second bending sub-area, an extending direction of each of the third hole groups is parallel to the first direction, and a hole depth of the third hole groups is less than a thickness of the support plate.

19. A foldable display module, comprising at least one bending area and non-bending areas connected to the bending area, the bending area connected between two of the non-bending areas, the bending area comprising a first bending center line parallel to a first direction, and comprising:

a display panel;

a support plate, disposed on a side of the display panel, wherein the support plate comprises a plurality of first hole groups and a plurality of second hole groups, each of extending directions of the first hole groups and the second hole groups is parallel to the first direction, the first hole groups and the second hole groups are alternately arranged along a second direction, and the second direction is arranged to form a preset angle with the first direction; each of the first hole groups comprises a plurality of first via holes spaced along the first direction, each of the second hole groups comprises a plurality of second via holes spaced along the first direction, and a length of each of the first via holes in the first direction is greater than a length of each of the second via holes in the first direction; and each of the first hole groups further comprises first spacer parts each located between two adjacent ones of the first via holes; and in the second direction, the second via holes are arranged corresponding to the first spacer parts;

wherein the bending area comprises a first bending sub-area, a first planar sub-area located on a periphery of the first bending sub-area, and a second bending sub-area located on a periphery of the first planar sub-area, and the second bending sub-area is connected to the non-bending areas;

the first bending center line is located in the first bending sub-area, the first hole groups and the second hole groups are located in the first bending sub-area; and the support plate further comprises a plurality of third hole groups disposed in the second bending sub-area, an extending direction of each of the third hole groups is parallel to the first direction, and a hole depth of the third hole groups is less than a thickness of the support plate.

20. The foldable display module according to claim 19, wherein the bending area further comprises a second bending center line parallel to the first direction and located in the second bending sub-area; and in a direction towards the second bending center line, the hole depth of the third hole groups gradually increases.

* * * * *